United States Patent
Wu

(10) Patent No.: US 12,433,575 B2
(45) Date of Patent: Oct. 7, 2025

(54) CALIBRATION DEVICE

(71) Applicant: Point Robotics Medtech Inc., Hsinchu County (TW)

(72) Inventor: Chao-Wei Wu, Hsinchu County (TW)

(73) Assignee: POINT ROBOTICS MEDTECH INC., Hsinchu County (TW)

( * ) Notice: Subject to any disclaimer, the term of this patent is extended or adjusted under 35 U.S.C. 154(b) by 286 days.

(21) Appl. No.: 18/476,324

(22) Filed: Sep. 28, 2023

(65) Prior Publication Data

US 2024/0366200 A1  Nov. 7, 2024

(30) Foreign Application Priority Data

May 5, 2023 (TW) .................................. 112116711

(51) Int. Cl.
*A61B 17/00* (2006.01)
*A61B 34/20* (2016.01)
*A61B 90/00* (2016.01)

(52) U.S. Cl.
CPC .............. *A61B 17/00* (2013.01); *A61B 34/20* (2016.02); *A61B 2017/00725* (2013.01);
(Continued)

(58) Field of Classification Search
CPC ................... A61B 17/00; A61B 34/20; A61B 2017/00725; A61B 2034/2055; A61B 2034/207; A61B 2090/3983
See application file for complete search history.

(56) References Cited

U.S. PATENT DOCUMENTS

| 6,511,418 B2 * | 1/2003 | Shahidi .................. A61B 5/064 |
| | | 73/1.79 |
| 6,996,487 B2 | 2/2006 | Jutras et al. |

(Continued)

FOREIGN PATENT DOCUMENTS

| CN | 1511249 A * | 7/2004 | ............ A61B 90/36 |
| CN | 112752534 A * | 5/2021 | ............ A61B 34/37 |

(Continued)

OTHER PUBLICATIONS

CN-112752534-A, English Translation (Year: 2021).*

(Continued)

*Primary Examiner* — Ryan D Walsh
(74) *Attorney, Agent, or Firm* — Li & Cai Intellectual Property Office

(57) ABSTRACT

A calibration device includes a calibration member, a handle, a fixing button, and a plurality of first markers. The calibration member includes a calibration body and a calibration groove. The calibration body has a first side and a second side opposite to the first side. The calibration groove is formed on the first side. The handle has a grip portion, and is adjacent to the first side and detachably disposed above the calibration groove. A calibration opening is formed between the handle and the first side. The fixing button is movably arranged in the handle, and has a fixing portion extending toward the calibration groove. The plurality of first markers are disposed on the second side. When the fixing button is pressed, a surgical instrument inserted into the calibration opening is held between the fixing portion and the calibration groove.

8 Claims, 7 Drawing Sheets

(52) U.S. Cl.
CPC . *A61B 2034/2055* (2016.02); *A61B 2034/207* (2016.02); *A61B 2090/3983* (2016.02)

(56) References Cited

U.S. PATENT DOCUMENTS

2010/0137967 A1* 6/2010 Atlani ..................... A61F 2/95
           623/1.11
2023/0118765 A1* 4/2023 Huang .................. A61B 34/10
           606/1

FOREIGN PATENT DOCUMENTS

| | | | | |
|---|---|---|---|---|
| CN | 118892333 A | * | 11/2024 | ............. A61B 17/00 |
| EP | 3991683 A1 | * | 5/2022 | ............. A61B 90/37 |
| ES | 2659867 T3 | * | 3/2018 | ........ A61M 39/1011 |
| WO | WO-8303343 A1 | * | 10/1983 | ......... A61B 17/3403 |
| WO | WO-2018115983 A1 | * | 6/2018 | ............... A61B 5/06 |
| WO | WO-2020073865 A1 | * | 4/2020 | ............. A61B 90/39 |

OTHER PUBLICATIONS

CN-118892333-A, English Translation (Year: 2024).*
CN-1511249-A, English Translation (Year: 2004).*
EP-3991683-A1, English Translation (Year: 2022).*
ES-2659867-T3, English Translation (Year: 2018).*
WO-2018115983-A1, English Translation (Year: 2018).*
WO-2020073865-A1, English Translation (Year: 2020).*
WO-8303343-A1, English Translation (Year: 1983).*

* cited by examiner

CALIBRATION DEVICE

CROSS-REFERENCE TO RELATED PATENT APPLICATION

This application claims the benefit of priority to Taiwan Patent Application No. 112116711, filed on May 5, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a calibration device, and more particularly to a calibration device for calibrating a surgical instrument.

BACKGROUND OF THE DISCLOSURE

In conventional calibrators for calibrating surgical instruments, the manner of setting up marker spheres does not accord to the consideration that a user may conveniently hold the calibrator. As such, during operation of a calibrator, a user may obstruct the marker spheres and unintentionally sway the calibrator as well as a to-be-calibrated surgical instrument to a great extent, thereby resulting in calibration failure.

In addition, though the calibrators are provided with holes for calibrating the surgical instruments, these holes have fixed dimensions and are dedicated to calibrating specific instruments, and thus can't be used for surgical instruments having other diameters.

Furthermore, a surface of a conventional calibrator is formed with a calibration groove, and the groove is used to accommodate a central shaft of a to-be-calibrated instrument for calibrating the instrument. Although such an open-type calibration groove is convenient for the user to put in the instrument, the instrument may easily drop out during calibration. In order to prevent the instrument from slipping or dropping out, when a medical staff places the instrument in the calibration groove and rotates the instrument for calibration, fingers of the medical staff must abut against the central shaft of the instrument. This will easily cause rubber gloves of the medical staff to be drawn into the calibration groove or get stuck between the calibration groove and the central shaft of the instrument, thereby resulting in calibration failure.

SUMMARY OF THE DISCLOSURE

In response to the above-referenced technical inadequacies, the present disclosure provides a calibration device for calibrating a surgical instrument.

In order to solve the above-mentioned problems, one of the technical aspects adopted by the present disclosure is to provide a calibration device, which includes a calibration member, a handle, a fixing button, and a plurality of first markers. The calibration member includes a calibration body and a calibration groove. The calibration body has a first side and a second side opposite to the first side. The calibration groove is formed on the first side. The handle has a grip portion, and is adjacent to the first side and detachably disposed above the calibration groove. A calibration opening is formed between the handle and the first side. The fixing button is movably arranged in the handle, and has a fixing portion extending toward the calibration groove. The plurality of first markers are disposed on the second side. When the fixing button is pressed, a surgical instrument inserted into the calibration opening is held between the fixing portion and the calibration groove.

Therefore, in the calibration device provided by the present disclosure, the structure of the handle allows a user to hold a calibrator conveniently and prevents the user from obstructing marker spheres. The calibrator is further provided with holes having different diameters for calibration of different instruments.

Furthermore, in the calibration device provided by the present disclosure, a V-shaped groove is located between the handle and the calibration member, and the surgical instrument inserted into the V-shaped groove is fixed by the fixing button. During calibration of a central shaft of the surgical instrument, the surgical instrument can be prevented from slipping. When the surgical instrument is rotated in the groove for calibration, the fixing button is used in cooperation with the semi-closed V-shaped groove, so as to prevent a glove of the user from being drawn into or stuck by the calibrator.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
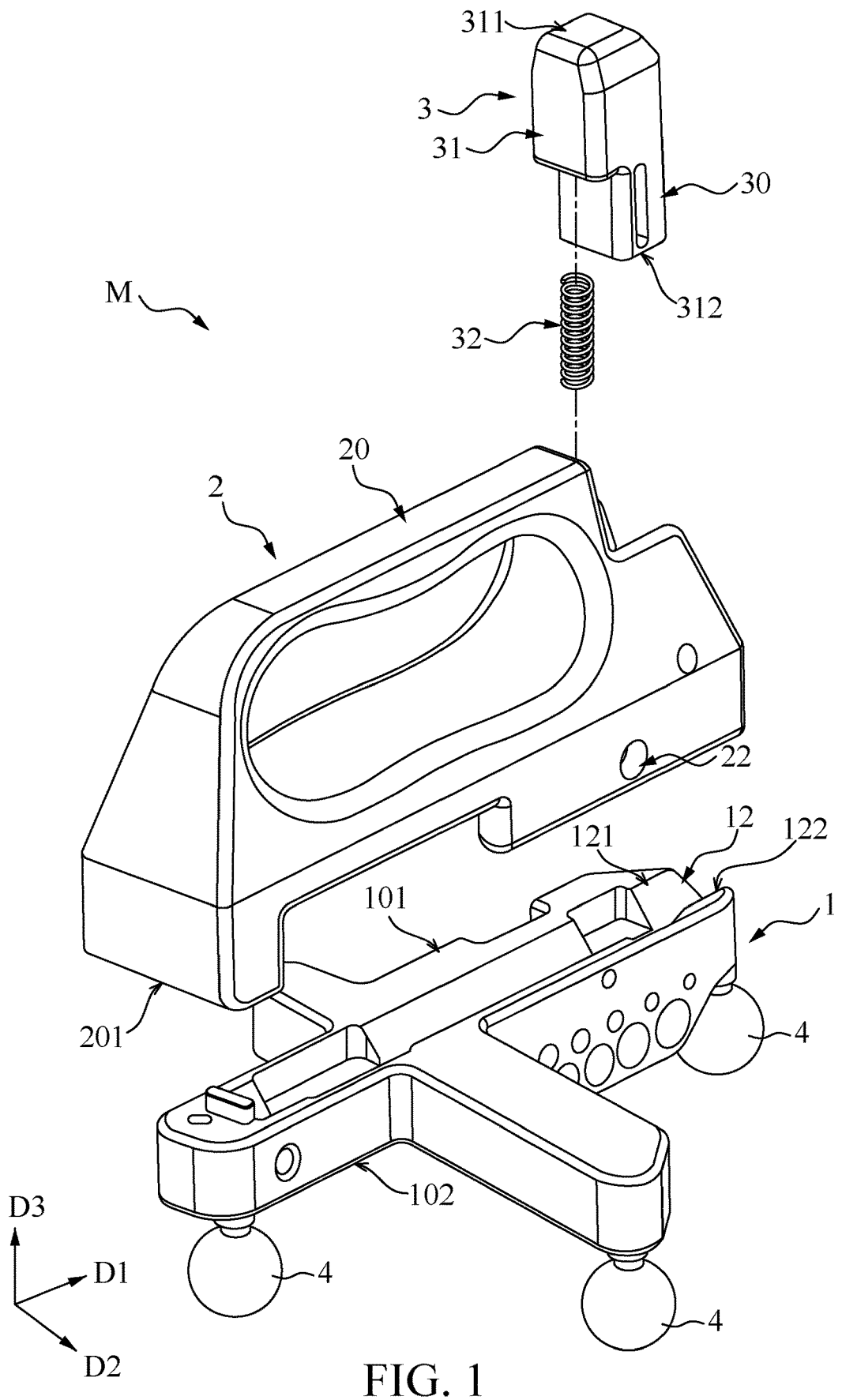
FIG. 1 is a schematic exploded view of a calibration device according to one embodiment of the present disclosure.
Figure 2:
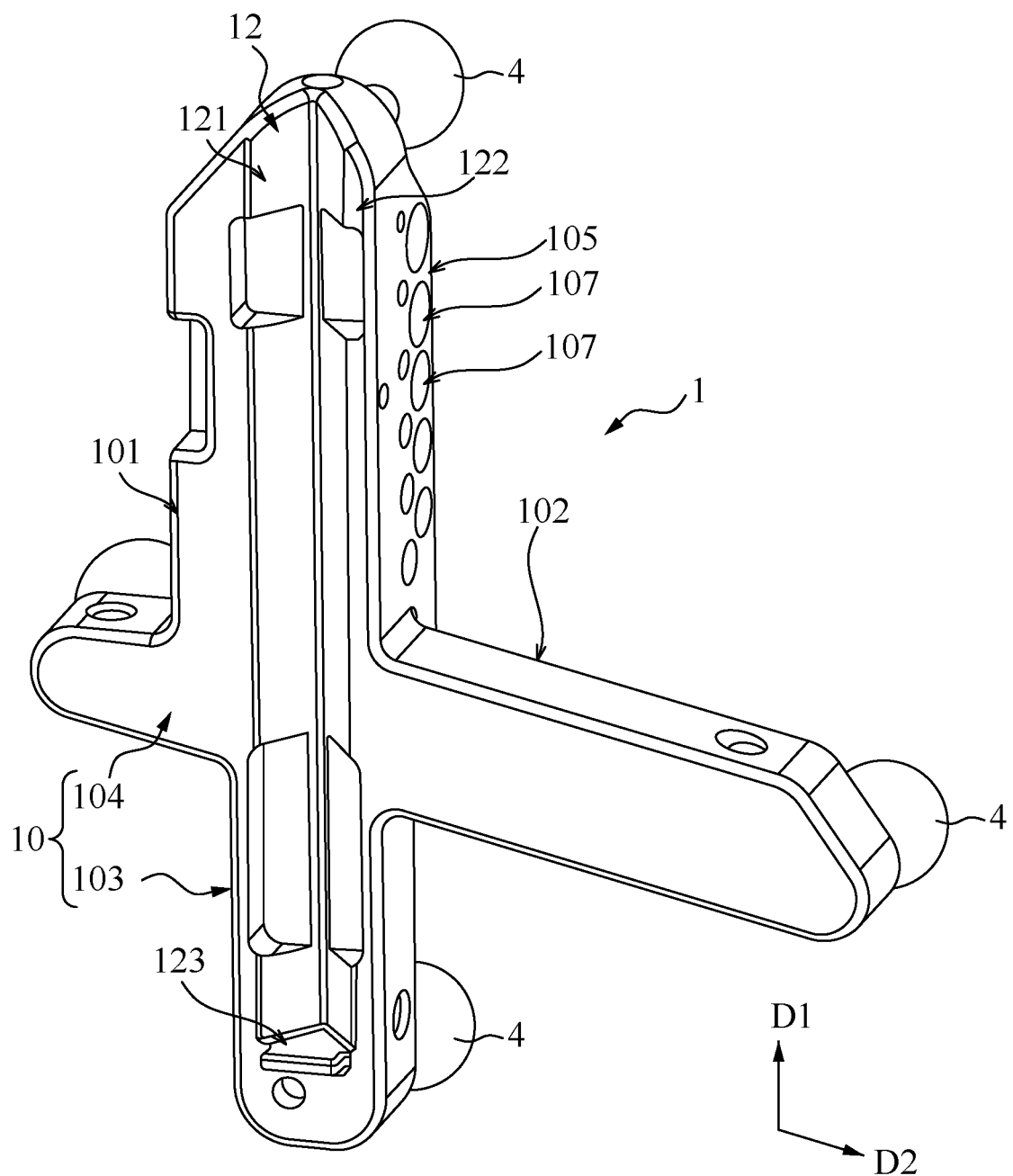
FIG. 2 is a schematic view of a first side of a calibration member according to one embodiment of the present disclosure.
Figure 3:
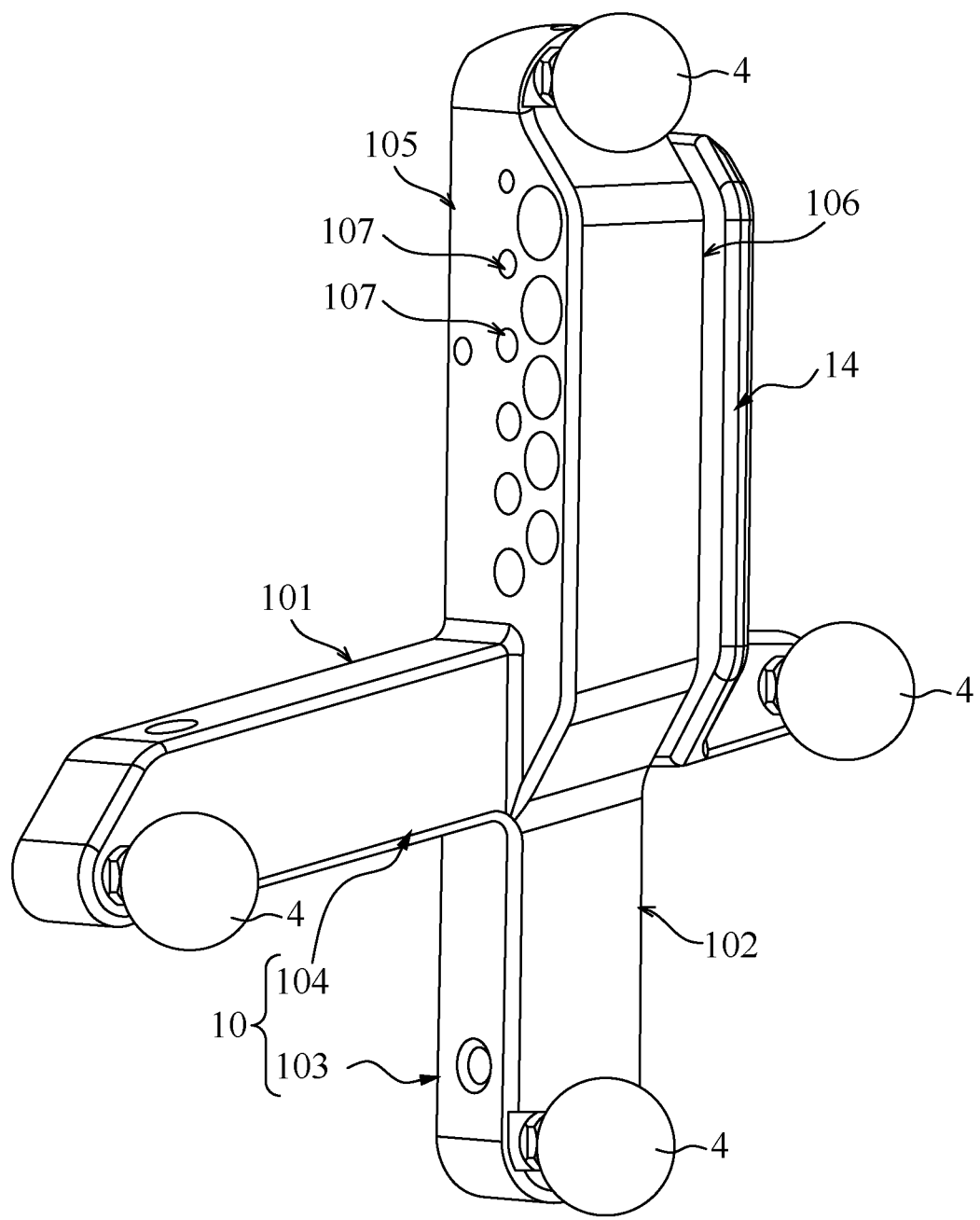
FIG. 3 is a schematic view of a second side of the calibration member according to one embodiment of the present disclosure.
Figure 4:
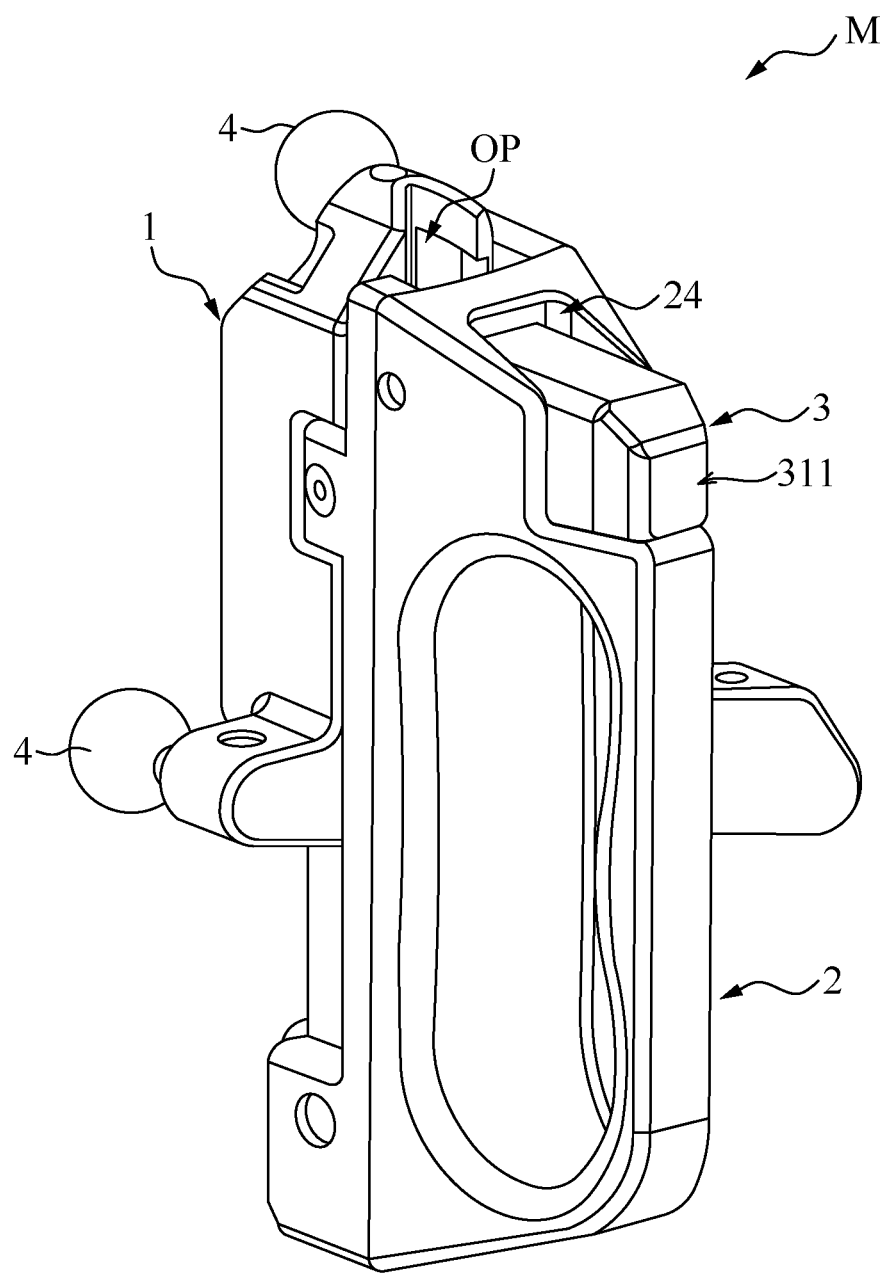
FIG. 4 is a schematic view showing the assembled calibration device according to one embodiment of the present disclosure.

FIG. 1 is a schematic exploded view of a calibration device according to one embodiment of the present disclosure. FIG. 2 is a schematic view of a first side of a calibration member according to one embodiment of the present disclosure. FIG. 3 is a schematic view of a second side of the calibration member according to one embodiment of the present disclosure. FIG. 4 is a schematic view showing the assembled calibration device according to one embodiment of the present disclosure.

Referring to FIGS. 1 to 4, one embodiment of the present disclosure provides a calibration device M. The calibration device M in particular refers to a calibration device used for calibrating a surgical instrument (such as a trocar). The calibration device M includes a calibration member 1, a handle 2, a fixing button 3, and a plurality of first markers 4.

The calibration member 1 includes a calibration body 10 and a calibration groove 12. The calibration member 1 can be made of medical-grade metal to increase strength and reduce abrasion caused by repeated use. The calibration body 10 has a first side 101 and a second side 102 opposite to the first side 101. The calibration body 10 can, for example, include a first strip 103 extending along a first direction D1 and a second strip 104 intersecting the first strip 103, the second strip 104 extends along a second direction D2, and the first strip 103 is connected to the second strip 104. The calibration groove 12 can be formed on the first side 101, and more precisely, formed along the first direction D1 on the first side 101 of the first strip 103. The calibration body 10 can be a rigid body. That is, unless excessive external force is intentionally applied to the calibration body 10, the shape of the calibration body 10 will not change easily. In some embodiments, the calibration body 10 can be integrally formed, and the first strip 103 and the second strip 104 are connected in an intersecting manner. However, the description here is only intended as an example, and the present disclosure is not limited thereto.

Furthermore, the calibration groove 12 can have a first groove surface 121 and a second groove surface 122. The second groove surface 122 is adjacent to the first groove surface 121, and forms an angle with the first groove surface 121. During calibration of a central shaft of the surgical instrument, the surgical instrument abuts against the calibration groove 12 formed by the second groove surface 122 and the first groove surface 121.

The handle 2 has a grip portion 20, which is, for example, a structure defined by a housing and held by a user's palm. The handle 2 is adjacent to the first side 101, and is detachably disposed above the calibration groove 12. A calibration opening OP is formed between the handle 2 and the first side 101. For example, after attaching the handle 2 to the calibration member 1 along a third direction D3, the handle 2 can be assembled to the calibration member 1 by locking metric screws through screw holes 22 on a side of the handle 2.

During calibration, the surgical instrument can be inserted into the calibration opening OP and enter the calibration groove 12. However, in order to further restrict the surgical instrument in the first direction D1 during calibration, the calibration groove 12 further has a stop surface 123. The stop surface 123 is disposed on an opposite side of the calibration opening OP, and the stop surface 123 is adjacent to the first groove surface 121 and the second groove surface 122. In other words, after the calibration member 1 is combined with the handle 2, the calibration groove 12 is defined by a joint surface 201, the stop surface 123, the first groove surface 121, and the second groove surface 122 of the handle 2, and the calibration groove 12 is semi-closed.

As shown in FIG. 1, the fixing button 3 is movably arranged in the handle 2, and has a fixing portion 30 extending toward the calibration groove 12. When the fixing button 3 is pressed, the surgical instrument inserted into the calibration opening OP will be held between the fixing portion 30 and the calibration groove 12. Therefore, by adjusting pressing strength through the fixing button 3, a fastening force used to abut against the surgical instrument can be changed, thereby increasing calibration efficiency.

In more detail, reference can be made to FIGS. 1 and 4. The handle 2 has a groove 24 for accommodating the fixing button 3 which can include a button body 31 and an elastic member 32. The elastic member 32 can be, for example, a spring, and is disposed between the button body 31 and the handle 2, such that the button body 31 is movably disposed in the handle 2. The button body 31 can be, for example, a plastic member, which has a pressing surface 311 and an abutting surface 312 opposite to the pressing surface 311. In this configuration, through the abutting surface 312, the fixing portion 30 can abut against the surgical instrument inserted into the calibration opening OP. More precisely, the surgical instrument inserted into the calibration opening OP is held among the first groove surface 121, the second groove surface 122, the stop surface 123, and the fixing portion 30. A semi-closed V-shaped groove formed by the first groove surface 121 and the second groove surface 122 can be used to limit the position of the central shaft of the surgical instrument.

The first markers 4 are disposed on the second side 102, and can be, for example, optical tracking markers. In this embodiment, a quantity of the first markers 4 is four, which can be arranged at both ends of the first strip 103 and at both ends of the second strip 104, respectively. The quantity and location of the first markers 4 can be changed according to practical requirements, and the present disclosure is not limited thereto. Preferably, the first markers 4 at both ends of the first strip 103 can be separated by a first predetermined distance, the first markers 4 at both ends of the second strip 104 can be separated by a second predetermined distance, and the first predetermined distance can be different from the second predetermined distance. In this way, the first markers 4 can be used to provide a reference for determining an orientation and a position of the calibration device M during calibration, and in particular, provide a reference for determining an orientation and a position of the calibration groove 12 in the calibration device M.

Figure 5:
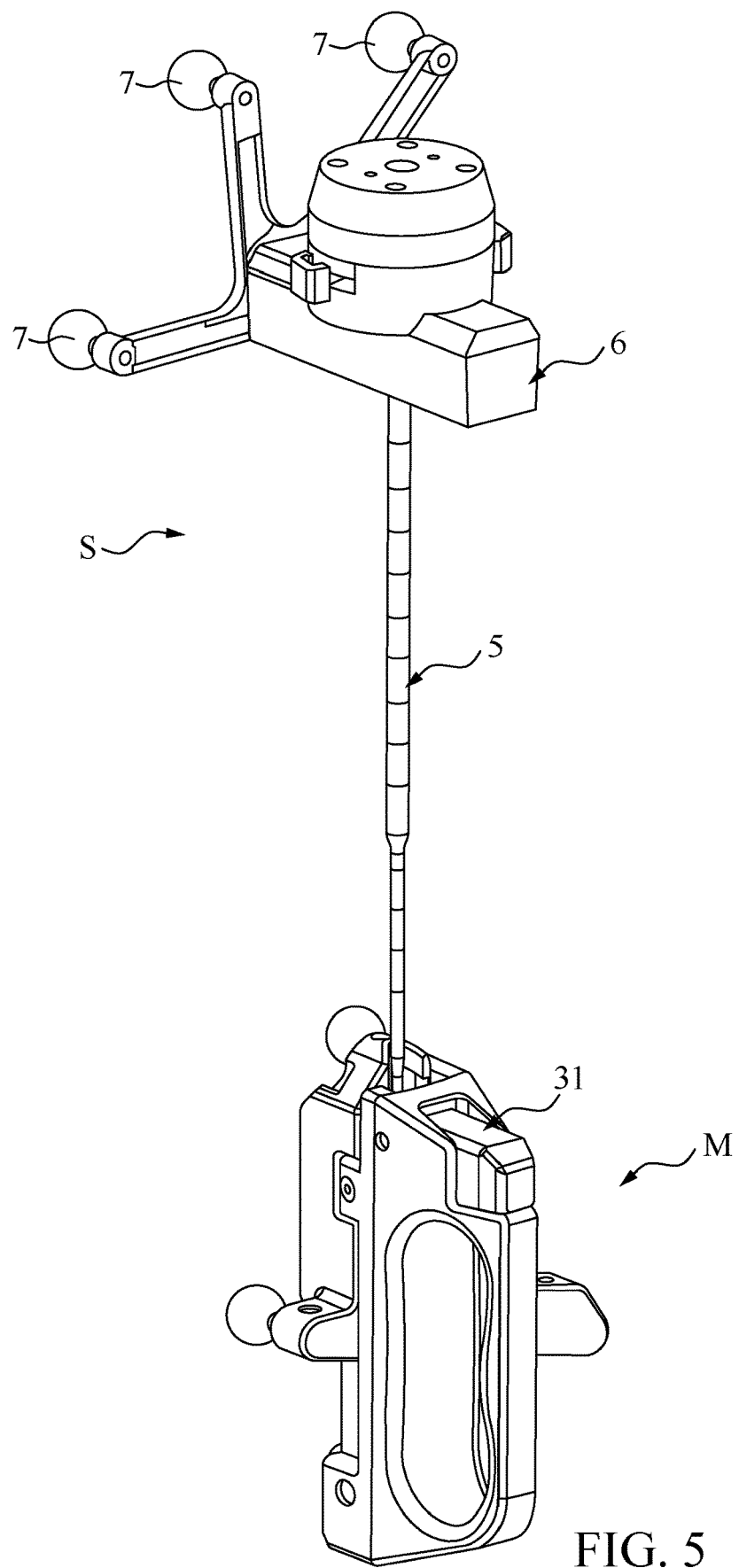
FIGS. 5 and 6 are schematic views showing a first calibration operation of the calibration device according to one embodiment of the present disclosure.
Figure 6:
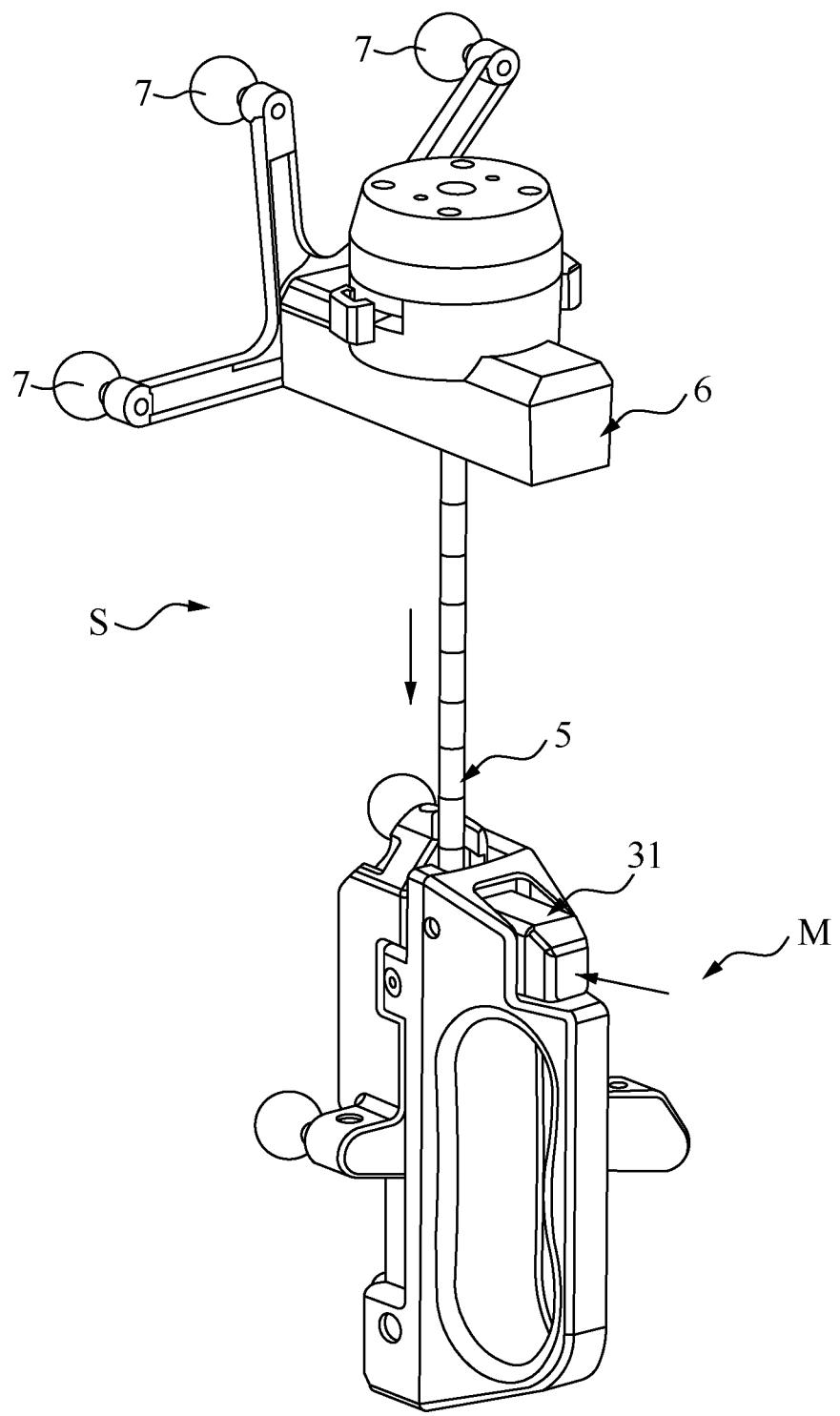

FIGS. 5 and 6 are schematic views showing a first calibration operation of the calibration device according to one embodiment of the present disclosure. Reference is made to FIGS. 5 and 6. In one embodiment of the present disclosure, the calibration device M can be used together with an optical tracking device, a surgical instrument S, and a processing device. The surgical instrument S can include, for example, a trocar 5 and an adapter 6. A plurality of second markers 7 are disposed on the adapter 6.

In a first calibration operation, the processing device can execute a navigation system and instruct the user to turn the calibration device M, such that the calibration opening OP faces upwards, and all the first markers 4 and the second markers 7 face toward the optical tracking device. The optical tracking device reads spatial coordinates of the surgical instrument S and the calibration device M. Next, the navigation system instructs the user to insert the surgical instrument S into the calibration opening OP of the calibration groove 12. As shown in FIG. 6, the navigation system further instructs the user to place the surgical instrument S in the calibration groove 12, such that a tip of the trocar 5 abuts against the stop surface 123. Then, the user presses the fixing button 3, such that the trocar 5 abuts against the first groove surface 121 and the second groove surface 122 of the calibration groove 12 and is thus positioned. In addition, the user rotates the surgical instrument S along an axial direction of the surgical instrument S. Accordingly, the navigation system can calibrate the surgical instrument S according to positions of the first markers 4 and the second markers 7 detected by the optical tracking device.

When the first calibration operation is completed, the button body 31 is released to return to an unpressed state through an elastic force of the elastic member 32, and the user can take the surgical instrument S out of the calibration groove 12 to end the calibration.

Reference is made to FIGS. 1 to 4 again. In addition to the calibration groove 12 for performing the first calibration operation, the calibration body 10 further includes a first side surface 105 and a second side surface 106 disposed between the first side 101 and the second side 102. The first side surface 105 is opposite to the second side surface 106, and a plurality of calibration through holes 107 are formed on the first side surface 105. The calibration through holes 107 penetrate through the calibration body 10 and extend toward the second side surface 106.

The calibration member 1 further includes a base plate 14 disposed near the second side surface 106, such that surgical instruments inserted into the calibration through holes 107 are allowed to abut against the base plate 14. In some embodiments, the base plate 14 can directly contact the second side surface 106, or be separated from the second side surface 106 by a predetermined gap, such that the user can visually confirm that the surgical instrument already abuts against the base plate 14. In order to be applicable to surgical instruments of different sizes, the calibration through holes 107 have different diameters, and cross-sections thereof can be, for example, circular-shaped. However, the present disclosure does not limit the shape of the cross-sections. In some embodiments, the range of sizes of surgical instruments adapted to the calibration through holes 107 do not completely overlap with that of instruments adapted to the calibration groove 12. For example, the calibration through holes 107 can be suitable for calibrating surgical instruments having a trocar outer diameter that ranges from 2 mm to 7 mm, while the calibration groove 12 is suitable for calibrating surgical instruments having a trocar outer diameter that ranges from 3 mm to 8 mm. In this way, the extent that the calibration device M is applicable to surgical instruments can be further enlarged.

Figure 7:
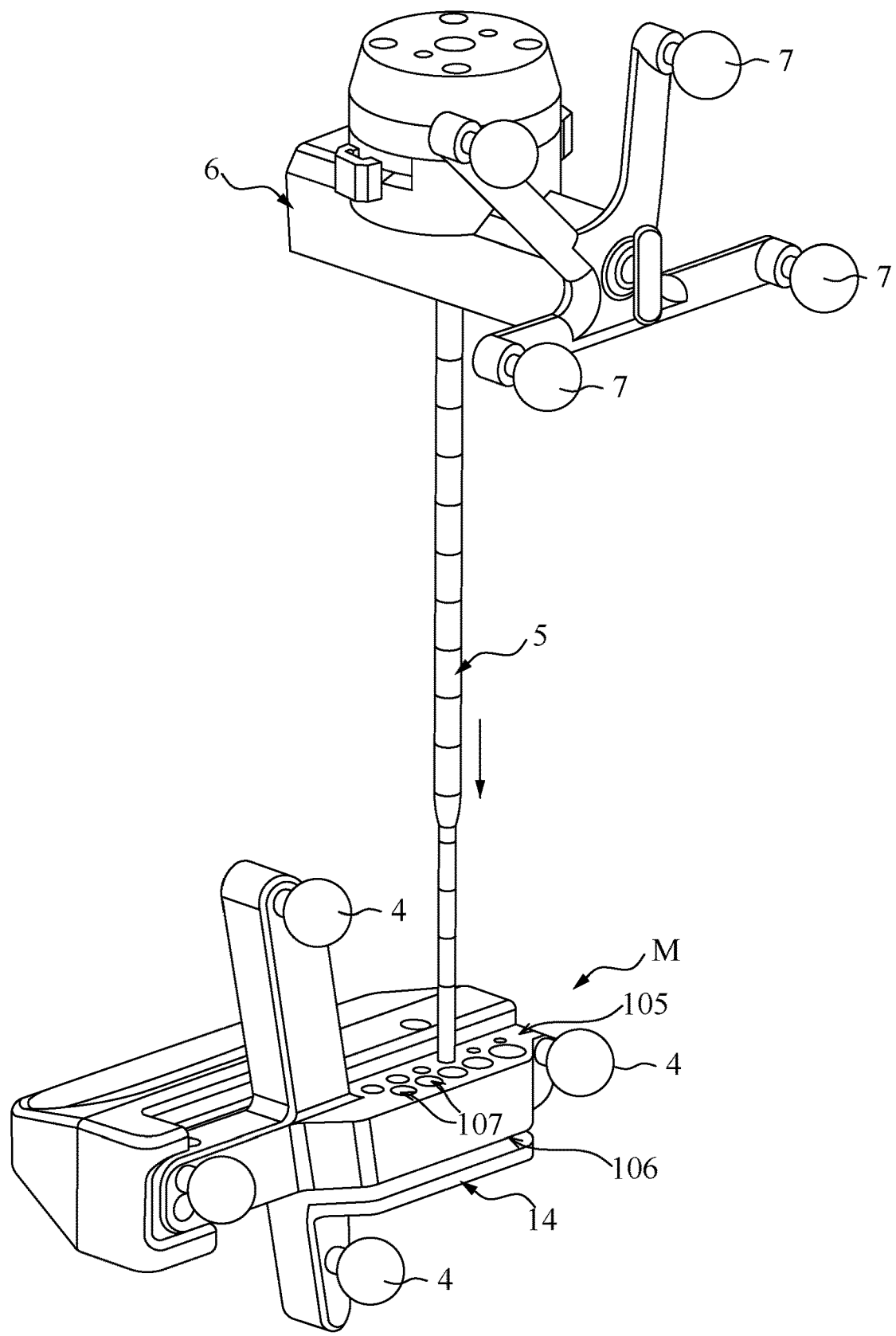
FIG. 7 is a schematic view showing a second calibration operation of the calibration device according to one embodiment of the present disclosure.

FIG. 7 is a schematic view showing a second calibration operation of the calibration device according to one embodiment of the present disclosure. As shown in FIG. 7, the second calibration operation can be performed under the architecture similar to the first calibration operation. In the second calibration operation, the processing device can execute the navigation system and instruct the user to turn the calibration device M, such that the calibration through holes 107 face upwards, and all the first markers 4 and the second markers 7 face toward the optical tracking device. The optical tracking device reads the spatial coordinates of the surgical instrument S and the calibration device M. Next, the navigation system instructs the user to insert the surgical instrument S into one of the calibration through holes 107 for abutting against the base plate 14. As shown in FIG. 7, the navigation system further instructs the user to rotate the surgical instrument S along the axial direction of the surgical instrument S. Accordingly, the navigation system can calibrate the surgical instrument S according to positions of the first markers 4 and the second markers 7 detected by the optical tracking device.

When the second calibration operation is completed, the user can take the surgical instrument S out of the calibration through hole 107 to end the calibration.

Beneficial Effects of the Embodiments

In conclusion, in the calibration device provided by the present disclosure, the structure of the handle allows the user to hold a calibrator conveniently and prevents the user from obstructing marker spheres. The calibrator is further provided with holes having different diameters for calibration of different instruments.

Furthermore, in the calibration device provided by the present disclosure, the V-shaped groove is located between the handle and the calibration member, and the surgical instrument inserted into the V-shaped groove is fixed by the fixing button. During calibration of the central shaft of the surgical instrument, the surgical instrument can be prevented from slipping. When the surgical instrument is rotated in the groove for calibration, the fixing button is used in cooperation with the semi-closed V-shaped groove, so as to prevent a glove of the user from being drawn into or stuck by the calibrator.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A calibration device, comprising:
    a calibration member including:
        a calibration body having a first side and a second side opposite to the first side; and
        a calibration groove formed on the first side;
    a handle having a grip portion, wherein the handle is adjacent to the first side and detachably disposed above the calibration groove, and a calibration opening is formed between the handle and the first side;
    a fixing button movably arranged in the handle, wherein the fixing button has a fixing portion extending toward the calibration groove; and
    a plurality of first markers disposed on the second side;
    wherein, when the fixing button is pressed, a surgical instrument inserted into the calibration opening is held between the fixing portion and the calibration groove.

2. The calibration device according to claim 1, wherein the calibration groove has:
    a first groove surface;
    a second groove surface disposed adjacent to the first groove surface, wherein an angle is formed between the second groove surface and the first groove surface; and
    a stop surface disposed on an opposite side of the calibration opening, wherein the stop surface is adjacent to the first groove surface and the second groove surface.

3. The calibration device according to claim 2, wherein the surgical instrument inserted into the calibration opening is held among the first groove surface, the second groove surface, the stop surface, and the fixing portion.

4. The calibration device according to claim 3, wherein the fixed button includes:
   a button body having a pressing surface and an abutting surface opposite to the pressing surface, wherein, through the abutting surface, the fixing portion abuts against the surgical instrument that is inserted into the calibration opening; and
   an elastic member, wherein the elastic member is disposed between the button body and the handle, such that the button body is movably arranged in the handle.

5. The calibration device according to claim 4, wherein the surgical instrument inserted into the calibration opening further includes a plurality of second markers.

6. The calibration device according to claim 1, wherein the calibration body further has a first side surface and a second side surface disposed between the first side and the second side, the first side surface is opposite to the second side surface, a plurality of calibration through holes are formed on the first side surface, and the plurality of calibration through holes penetrate through the calibration body and extend toward the second side surface.

7. The calibration device according to claim 6, wherein the calibration member further includes a base plate disposed near the second side surface, and the surgical instrument inserted into one of the calibration through holes abuts against the base plate.

8. The calibration device according to claim 6, wherein cross-sections of the plurality of calibration through holes are circular-shaped, and have different diameters from each other.

* * * * *